United States Patent
Dugan

(10) Patent No.: US 9,301,080 B2
(45) Date of Patent: Mar. 29, 2016

(54) METHODS AND APPARATUS FOR REDUCING CELLULAR TELEPHONE RADIATION EXPOSURE

(76) Inventor: Brian M. Dugan, Sleepy Hollow, NY (US)

(*) Notice: Subject to any disclaimer, the term of this patent is extended or adjusted under 35 U.S.C. 154(b) by 3 days.

(21) Appl. No.: 13/485,776

(22) Filed: May 31, 2012

(65) Prior Publication Data
US 2012/0309382 A1    Dec. 6, 2012

Related U.S. Application Data

(60) Provisional application No. 61/491,890, filed on May 31, 2011, provisional application No. 61/492,349, filed on Jun. 1, 2011.

(51) Int. Cl.
*H04W 4/00* (2009.01)
*H04M 1/02* (2006.01)
*H04M 1/725* (2006.01)

(52) U.S. Cl.
CPC ............ *H04W 4/001* (2013.01); *H04M 1/0256* (2013.01); *H04M 1/7253* (2013.01); *H04M 2250/02* (2013.01); *H04M 2250/06* (2013.01)

(58) Field of Classification Search
CPC .................................. H04B 7/00; H04W 88/02
See application file for complete search history.

(56) References Cited

U.S. PATENT DOCUMENTS

| | | | |
|---|---|---|---|
| 2007/0081551 A1* | 4/2007 | Oishi et al. | 370/463 |
| 2008/0273297 A1* | 11/2008 | Kumar | 361/680 |
| 2010/0056210 A1* | 3/2010 | Bychkov et al. | 455/556.1 |
| 2011/0004502 A1* | 1/2011 | Dillard et al. | 705/9 |
| 2012/0139690 A1* | 6/2012 | Gupta et al. | 340/5.1 |
| 2012/0225622 A1* | 9/2012 | Kudrna et al. | 455/41.2 |

* cited by examiner

*Primary Examiner* — Keith Fang
(74) *Attorney, Agent, or Firm* — Dugan & Dugan, PC

(57) ABSTRACT

In some aspects, a cellular telephone includes (1) a user interface portion having a communications circuit; and (2) a cellular portion having a first communications circuit adapted to communicate with the communications circuit of the user interface portion and a second communications circuit adapted to communicate with a cellular network. The cellular portion is removably coupled to the user interface portion so as to allow a user of the cellular telephone to communicate over a cellular network by using the user interface portion while the cellular portion is separated from the user interface portion. Numerous other aspects are provided.

20 Claims, 3 Drawing Sheets

METHODS AND APPARATUS FOR REDUCING CELLULAR TELEPHONE RADIATION EXPOSURE

The present application claims priority to U.S. Provisional Patent Application No. 61/491,890, filed May 31, 2011 and titled "METHODS AND APPARATUS FOR REDUCING CELLULAR TELEPHONE RADIATION EXPOSURE," and U.S. Provisional Patent Application No. 61/492,349, filed Jun. 1, 2011, and titled "METHODS AND APPARATUS FOR REDUCING CELLULAR TELEPHONE RADIATION EXPOSURE." Each of the above applications is hereby incorporated herein by reference in its entirety for all purposes.

FIELD OF THE INVENTION

The present invention relates to cellular telephones, and more particularly to reducing exposure to radiation from cellular telephones.

BACKGROUND

Cellular telephones are very convenient and have become important to modern society. Cellular telephones allow people to be in constant contact, access voice and data virtually anywhere, etc. However, some recent studies have shown a potential increased risk of cancer associated with use of cellular telephones. Accordingly, a need exists for methods and apparatus for reducing cellular telephone radiation exposure.

SUMMARY

In some aspects, a system is provided that includes (1) a low radiation handset; and (2) a cellular unit separate from the low radiation handset and adapted to communicate with the low radiation handset and to allow the low radiation handset to communicate over a cellular network.

In some aspects, a cellular telephone includes (1) a user interface portion having a communications circuit; and (2) a cellular portion having a first communications circuit adapted to communicate with the communications circuit of the user interface portion and a second communications circuit adapted to communicate with a cellular network. The cellular portion is removably coupled to the user interface portion so as to allow a user of the cellular telephone to communicate over a cellular network by using the user interface portion while the cellular portion is separated from the user interface portion.

In some aspects, a method is provided that includes providing a cellular telephone having (1) a user interface portion having a communications circuit; and (2) a cellular portion having a first communications circuit adapted to communicate with the communications circuit of the user interface portion and a second communications circuit adapted to communicate with a cellular network. The method includes detaching the cellular portion from the user interface portion; and using the user interface portion to place a cellular telephone call when the cellular portion is detached from the user interface portion.

Numerous other aspects are provided, as are various methods, apparatus and computer program products for carrying out these and other aspects of the invention. Each computer program product may be carried by a medium readable by a computer (e.g., a carrier wave signal, a floppy disc, a hard drive, a random access memory, etc.).

Other features and aspects of the present invention will become more fully apparent from the following detailed description, the appended claims, and the accompanying drawings.

DETAILED DESCRIPTION

Figure 1:
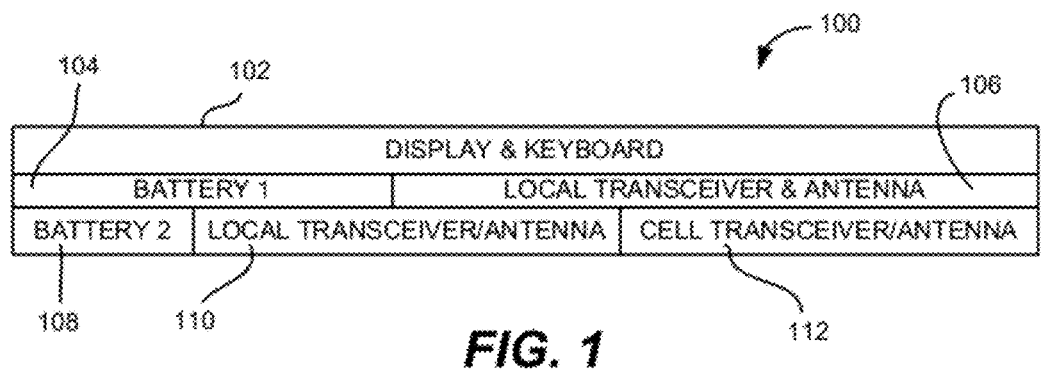
FIG. 1 is a side schematic diagram of a cellular telephone provided in accordance with the present invention.

Cellular telephones emit electromagnetic radiation when communicating over a cellular network. The amount of radiation emitted varies, with larger amounts of radiation typically being emitted when a cellular telephone is indoors, further away from a cellular tower or otherwise located in a poor signal strength area in relation to a cellular network.

In one or more embodiments of the invention, methods and apparatus are provided for reducing exposure of a person to radiation from a cellular telephone while still allowing the user to communicate via the cellular network. For example, in some embodiments, a low radiation (LR) handset is provided that is similar to a regular cellular telephone in layout and/or function. "Low radiation" refers to a radiation level below that typically used by a cellular telephone communicating with a cellular tower and/or cellular network (particularly when the cellular telephone is indoors or far from a cellular tower). For example, in some embodiments, low radiation may be less than about 0.2 SAR, in other embodiments less than about 0.1 SAR and in other embodiments less than about 0.05 SAR (1.6 Watts/kilogram standard). Larger or smaller radiation levels may be used.

In one or more embodiments, the LR handset communicates through a cellular telephone a short distance from the LR handset (e.g., in the same room, building, office, apartment or house). For example, a user may use the LR handset to place calls, receive calls, send text messages, surf the WEB or perform any traditional cellular telephone activities by tethering to, piggy-backing off of or otherwise employing the cellular telephone to communicate with a cellular network. The LR handset only requires enough signal strength to communicate with the cellular telephone (or a portion of the cellular telephone as described below) which may be placed a short distance from the user (e.g., in the same room, office, house, across a yard or sports field, etc.). In this manner, the user is not directly exposed to the cellular telephone's more powerful radiation because the cellular telephone is not in direct contact with the user (e.g., in the user's hand, next to the user's head, against the user's waist, in the user's pocket, etc.). Rather, the cellular telephone may be remote from the user. In some embodiments, multiple LR handsets may communicate across a cellular network via a single cellular telephone.

As stated, in some embodiments, the LR handset may be similar (or nearly identical) to a traditional cellular telephone in look, size, functionality, or the like.

In some embodiments, a transmitter/receiver unit capable of communicating over a cellular network may be provided in place of a cellular telephone. An LR handset may then communicate through a cellular network via the transmitter/receiver unit (e.g., in place of or in addition to a cellular telephone). The transmitter/receiver unit may be located a distance from the user so that the user is not directly exposed to the transmitter/receiver unit's more powerful radiation. For example, the transmitter/receiver unit may be located outside of a user's home, office, car, in the same room, office, house, etc.

Use of a separate "cellular" unit (e.g., a portion of a cellular telephone, a transmitter/receiver unit, etc.) to communicate via the cellular network allows the LR handset to use less radiation, be smaller, lighter and cheaper, and to consume significantly less battery power. For example, the separate cellular unit may be plugged into an electrical outlet or otherwise receive line voltage. Furthermore, the cellular unit may employ larger or otherwise more effective antennas or even higher transmission power levels to improve cellular coverage. In some embodiments, the LR handset may employ WiFi, Bluetooth or a similar communications protocol to communicate with the separate "cellular" unit (e.g., allowing for easy use of multiple LR handsets, creating a cellular "hot spot", or the like).

In some embodiments, a cellular telephone may be provided in which a portion of the cellular telephone that communicates with a cellular network such as the antenna and/or transmitter/receiver circuitry, referred to herein as "cellular portion", is detachable yet still operable with the remainder of the cellular telephone (e.g., an LR handset or "user interface portion" when the cellular portion is removed). For example, the cellular portion may be detached from the cellular telephone and placed a short distance from the remainder of the cellular telephone such as at the edge of a desk, in the same room, in a different room, across an office, or the like, and the remaining LR handset (and/or user interface portion) may communicate with the cellular portion to access a cellular network.

In some embodiments, the cellular portion may be attached to a separate power supply (e.g., another battery, line voltage, etc.) than is used by the LR handset. The cellular portion may communicate with the LR handset wirelessly or via one or more wires. For example, the LR handset may communicate with the cellular portion via Bluetooth, WiFi, or the like.

FIG. 1 illustrates an exemplary cellular telephone 100 provided in accordance with an embodiment of the present invention. The cellular telephone 100 includes a display 102 which in some embodiments may also serve as a keyboard. In other embodiments, a separate keyboard may be provided. A first battery 104 is provided for powering a first local transceiver circuit and/or antenna 106 and a second battery 108 is provided for powering a second local transceiver circuit and/or antenna 110, as well as a cellular transceiver circuit and/or antenna 112. As will be described further below, the first and second local transceiver circuits and/or antennas 106 and 110, or similar communications circuitry, may function as "low radiation level" communications circuitry emitting lower levels of radiation than the portion of the cellular telephone 100 that communicates with a cellular network (e.g., cellular transceiver circuit/antenna 112 or another higher radiation level communications circuit). Additional circuitry (not shown) may be provided such as microprocessors, microcontrollers, memory, input/output circuitry, display driver circuitry, and/or any other similar circuitry suitable for use with a cellular telephone. Fewer or more batteries and/or other power sources may be employed.

Figure 2A:
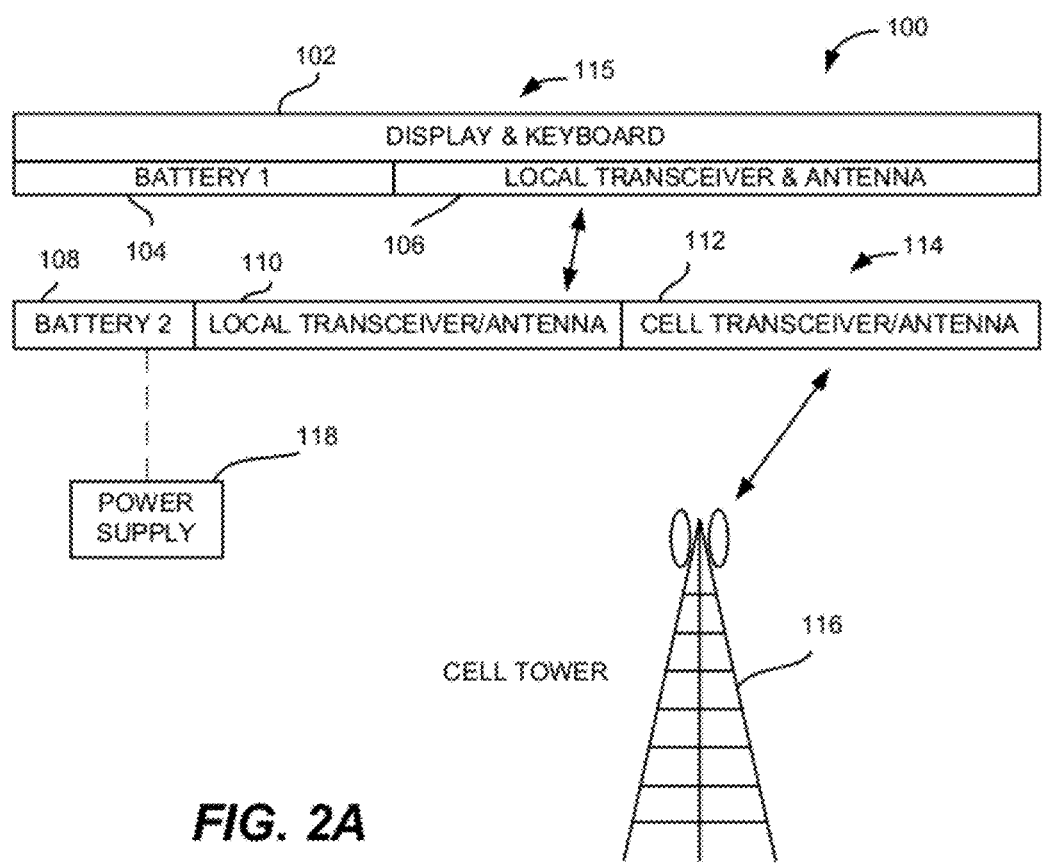
FIG. 2A is a side schematic diagram of the cellular telephone of FIG. 1 with a cellular portion removed in accordance with the present invention.

With reference to FIG. 2A, when desired, the second battery 108, second local transceiver circuit/antenna 110, and the cellular transceiver circuit/antenna 112 may be removed (e.g., as a "cellular" unit 114) from the cellular telephone 100 and remain in communication with the cellular telephone 100 (e.g., via communication between the first and second local transceiver circuits 106 and 110 or similar circuitry). The remainder of the cellular telephone 100 without the cellular unit 114 may function as a user interface portion 115. The first and second local transceiver circuits 106 and 110 may communicate via a wireless or wired channel. In some embodiments, a wireless protocol such as Bluetooth, WiFi, or any other suitable protocol may be used for communication between the first and second local transceiver circuits 106 and 110. The cellular transceiver circuit/antenna 112 (or similar circuitry) may remain in communication with a cellular network, such as via a cell tower 116 in FIG. 2A.

In some embodiments, the power level used for communication between the local transceiver circuit/antennas 106 and 110 may be significantly less than the power level used for communication between the cellular transceiver circuit/antenna 112 and the cell tower 116. For example, in some embodiments, the power levels used by cellular transceiver circuit/antenna 112 may be up to 1.6 SAR or higher, whereas the power levels used by the local transceiver circuit/antenna 106 and/or 110 may be less than about 0.2 SAR, in other embodiments less than about 0.1 SAR and in other embodiments less than about 0.05 SAR (1.6 Watts/kilogram standard). Other power levels may be used for any of these circuits. In some embodiments, different communication frequencies also may be used.

Figure 2B:
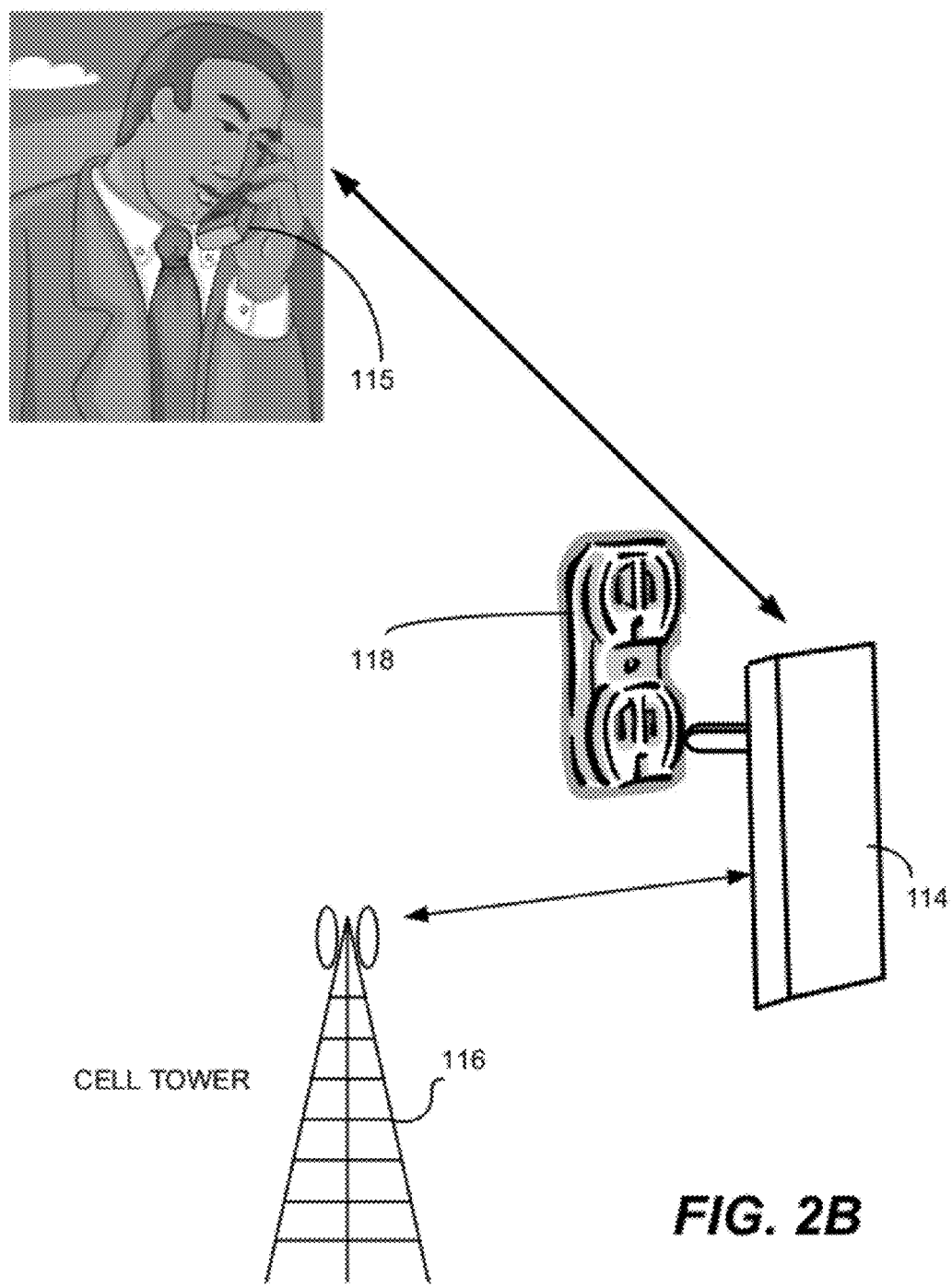
FIG. 2B is a side schematic diagram of the cellular telephone of FIG. 1 with a cellular portion being plugged into an outlet in accordance with the present invention.

In operation, a user of the cellular telephone 100 may detach the cellular unit 114 from the cellular telephone 100 and place the cellular unit 114 a distance from the user so as to limit exposure of the user to radiation from the cellular transceiver circuit/antenna 112 during use of the cellular telephone 100. In some embodiments, the cellular unit 114 may be connected to a supplemental power source such as an additional battery or line voltage. In this manner, battery life of the cellular telephone 100 may be extended and exposure of the user to radiation from the cellular transceiver circuit/antenna 112 may be reduced. For example, FIG. 2B illustrates a cellular unit 114 detached from user interface portion 115. The cellular portion 114 may include a foldable plug for connecting cellular unit 114 to an electrical outlet 118. In some embodiments, the cellular unit 114 may be attached to the user, such as at the user's waist if desired.

In some embodiments, the signal strength output by the cellular unit 114 may be increased when the cellular unit 114 is detached from the remainder of the cellular telephone 100. For instance, a switch, electrical contact or the like (not shown) may be provided that senses when the cellular unit 114 and interface portion 115 are not in contact. Thereafter the maximum power level of the electromagnetic radiation emitted from cellular unit 114 may be increased.

Figure 3:
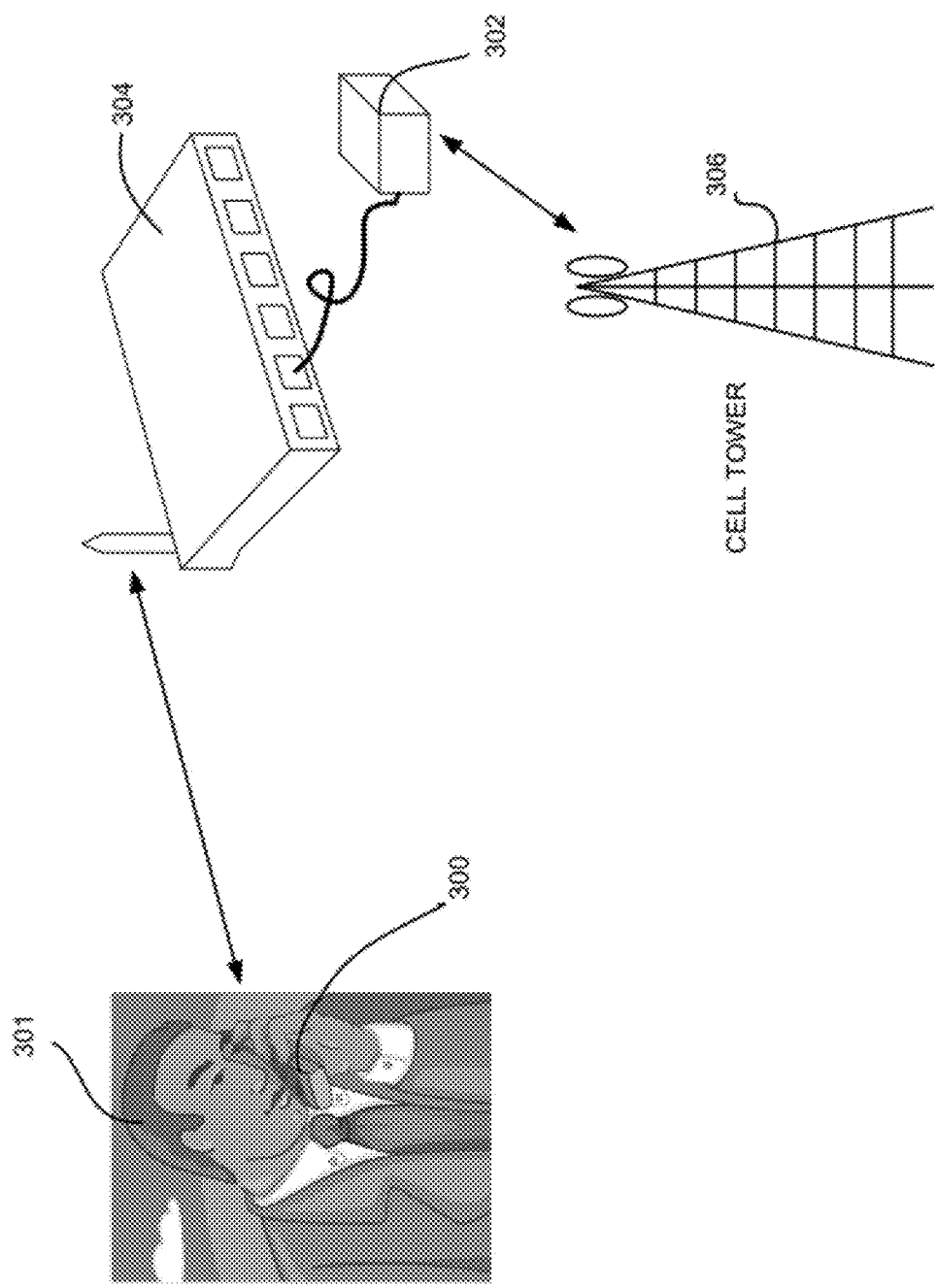
FIG. 3 is a schematic diagram of a cellular unit provided in accordance with the present invention.

FIG. 3 illustrates an alternative embodiment of the present invention in which a cellular telephone 300 may automatically enter a low radiation mode to reduce exposure of a user 301 to radiation. With reference to FIG. 3, a cellular unit 302 is provided that may communicate with both the cellular telephone 300 via a low radiation (LR) communication device 304 and a cellular network (not separately shown) via a cell tower 306. In some embodiments, the LR communication device 304 may be a wireless router that employs WiFi or a similar wireless protocol, although other LR communication devices may be used (e.g., a communication device that uses Bluetooth or another wireless protocol). For example, the cellular unit 302 may plug into the LR communication device 304 via a CAT5 or similar cable, or communicate wirelessly with the LR communication device 304.

The cellular telephone 300 may include a mobile application or be otherwise configured to detect the presence of the cellular unit 302 when the cellular telephone 300 is within range of the LR communication device 304. In such instances, the cellular telephone 300 may enter a low radiation mode, such as an airplane mode, and stop communicating directly with the cell tower 306. For instance, the circuitry used to communicate with cellular towers may be disabled within the cellular telephone 300 while low radiation emitting communications circuitry such as WiFi, Bluetooth, or similar circuitry may remain active. The cellular telephone 300 may communicate with the cell tower 306 indirectly by communicating with the cellular unit 302 through the LR communication device 304. The higher radiation levels used to communicate with the cell tower 306 thereby may be remote from the user 301 and radiation exposure of the user 301 may be reduced relative to communications that occur directly between the cellular telephone 300 and the cell tower 306 (e.g., when the cell phone 300 is in contact or proximate the user 301 as shown).

In some embodiments, cellular units 302 may communicate directly with the cellular telephone 300 and cell tower 306 without use of the LR communication device 304 (e.g., via WiFi or a similar protocol). Cellular units 302 may be located wherever the user communicates on his/her cell phone often (e.g., at home, at an apartment, at an office, in a car, etc.). In each case, the cellular unit 302 may be located a distance from the user to reduce close range exposure of the user to radiation associated with communicating over a cellular network. In some embodiments, the cellular telephone 300 may automatically detect the presence of a cellular unit 302 and seamlessly switch to a low radiation mode (e.g., reducing radiation exposure of the user and extending battery life of the cellular telephone). In some embodiments, multiple cellular telephones may communicate over a cellular network via a cellular unit 302. For example, a cellular network may allow a multi-line or multi-party license or access to a cellular network via a cellular unit 302.

In one or more embodiments, the cellular unit 302 may employ a higher power level, larger antenna and/or better location for communicating with the cell tower 306 than would be possible for the cellular telephone 300, improving cellular reception.

Accordingly, while the present invention has been disclosed in connection with exemplary embodiments thereof, it should be understood that other embodiments may fall within the spirit and scope of the invention, as defined by the following claims.

The invention claimed is:

1. A cellular telephone comprising:
  a first portion including a user interface and a low radiation level communications circuit; and
  a second portion including a low radiation level communications circuit and a cellular communications circuit;
  wherein the low radiation level communication circuits of the first and second portions are operative to communicate with each other both when the first and second portions are coupled and when they are separated;
  wherein the first and second portions are removably coupled to each other so as to allow a user of the cellular telephone to communicate over a cellular network by communicating through the first portion to the second portion while the second portion is separated from the first portion;
  wherein a first communication power level, between the first portion and the second portion, is lower than a second communication power level, between the second portion and the cellular network, to reduce radiation exposure to the user,
  wherein the second portion is operable to sense that the second portion is separated from the first portion,
  wherein the second portion is operable to automatically increase the second communication power level to a third communication power level when the second portion senses that the second portion is separated from the first portion;
  wherein the first communication power level of the first portion is provided by a first power supply that includes a battery; and
  wherein the second communication power level of the second portion is provided by a second power supply.

2. The cellular telephone of claim 1 wherein the first portion includes a display and a battery.

3. The cellular telephone of claim 2 wherein the second portion includes a plug for connecting the second portion to a line voltage.

4. The cellular telephone of claim 1 wherein the second portion is operable at the second communication power level when physically coupled to the first portion.

5. The cellular telephone of claim 4 wherein the second portion switches to the second communication power level automatically when the second portion is physically coupled to the first portion.

6. The cellular telephone of claim 1 wherein the third communication power level is greater than a maximum electromagnetic radiation power level permissible for a cellular telephone.

7. A method comprising:
  providing a cellular telephone having:
    a first portion having a low radiation level communications circuit and a user interface; and
    a second portion having a non-cellular communications circuit adapted to communicate with the low radiation level communications circuit of the first portion and a cellular communications circuit adapted to communicate with a cellular network concurrent with the non-cellular communications circuit communicating with the low radiation level communications circuit of the first portion, wherein the second portion is adapted to relay information between the first portion and the cellular network and wherein a first communication power level, between the first portion and the second portion, is lower than a second communication power level, between the second portion and the cellular network, to reduce radiation exposure to a user;
    wherein the first communication power level of the first portion is provided by a first power supply that includes a battery; and
    wherein the second communication power level of the second portion is provided by a second power supply;
  detaching the second portion from the first portion;
  using the first portion to place a cellular telephone call relayed through the second portion when the second portion is detached from the first portion,
  sensing, by the second portion, that the second portion is separated from the first portion, and
  increasing, automatically, the second communication power level to a third communication power level when the second portion senses that the second portion is separated from the first portion.

8. The method of claim 7 wherein using the first portion includes powering the first portion with a battery to power a display.

9. The method of claim 8 wherein using the first portion includes powering the second portion with a line voltage.

10. The method of claim 7 further comprising:
operating the second portion at the second communication power level when the second portion is physically coupled to the first portion.

11. The method of claim 10 further comprising:
switching the second portion to the second communication power level automatically when the second portion is physically coupled to the first portion.

12. The method of claim 7 wherein the third communication power level is greater than a maximum electromagnetic radiation power level permissible for a cellular telephone.

13. A wireless phone comprising:
a low radiation (LR) wireless communicator including a user interface; and
a high radiation (HR) wireless communicator including a high power wireless network communication circuit,
wherein the LR and HR wireless communicators are adapted to physically couple together for conventional use as a wireless phone, and
wherein the LR and HR wireless communicators are adapted to be physically separated and still allow use of the wireless phone to make calls on a wireless network wherein the HR wireless communicator relays communications signals between the LR wireless communicator and the wireless network and wherein a first communication power level, between the LR and HR wireless communicators, is lower than a second communication power level, between the HR wireless communicator and the wireless network, to reduce radiation exposure to a user,
wherein the HR wireless communicator is operable to sense that the HR wireless communicator is separated from the LR wireless communicator,
wherein the HR wireless communicator is operable to automatically increase the second communication power level to a third communication power level when the HR wireless communicator senses that the HR wireless communicator is separated from the LR wireless communicator
wherein the first communication power level of the LR wireless communicator is provided by a first power supply that includes a battery; and
wherein the second communication power level of the HR wireless communicator is provided by a second power supply.

14. The wireless phone of claim 13 wherein the LR and HR wireless communicators are further adapted to allow a user to make calls on a wireless network when separated without exposing the user to radiation levels of a conventional wireless phone.

15. The wireless phone of claim 13 wherein the LR wireless communicator does not include a wireless network communication circuit.

16. The wireless phone of claim 13 wherein the HR wireless communicator does not include a user interface.

17. The wireless phone of claim 13 wherein the HR wireless communicator is operable at the second communication power level when physically coupled to the LR wireless communicator.

18. The wireless phone of claim 17 wherein the HR wireless communicator switches to the second communication power level automatically when the HR wireless communicator is physically coupled to the LR wireless communicator.

19. The wireless phone of claim 13 wherein the LR wireless communicator is adapted to communicate with the HR wireless communicator via a wireless router.

20. The wireless phone of claim 13 wherein the third communication power level is greater than a maximum electromagnetic radiation power level permissible for a cellular telephone.

* * * * *